United States Patent [19]

Hughes et al.

[11] 3,841,300

[45] Oct. 15, 1974

[54] HEATING APPARATUS

[75] Inventors: John M. Kyffin Hughes, Solihull;
Brian Harding, West Bromwich;
Graham Albert John Lake,
Birmingham, all of England

[73] Assignee: **Parkinson Cowan Appliances
Limited,** Stechford, Birmingham,
England

[22] Filed: Dec. 12, 1973

[21] Appl. No.: 426,624

[52] U.S. Cl. .................. 126/91 A, 165/181, 431/353
[51] Int. Cl. ............................................. F24c 3/04
[58] Field of Search ............ 126/91 A; 431/350, 353

[56] References Cited
UNITED STATES PATENTS

| | | | |
|---|---|---|---|
| 2,105,533 | 1/1938 | Hess | 126/91 A |
| 3,133,527 | 5/1964 | Mizer | 431/353 X |
| 3,174,474 | 3/1965 | Jones et al. | 126/91 A |

*Primary Examiner*—Edward G. Favors

[57] ABSTRACT

Heating apparatus for imparting heat to a fluid comprising a heating unit formed from at least two bodies of heat conducting material. Each body has an elongated groove and opposite longitudinal edges of the groove are defined by a first and second set respectively of spaced parallel walls upstanding on a base and defining respectively two rows of spaced parallel channels which communicate respectively with said opposite longitudinal edges of the associated groove. The two bodies are connected together with the walls of the first and second sets of one of the bodies disposed respectively in the channels defined between the first and second sets of the other body, the thickness of the walls relatively to the spacing between adjacent walls of each set being arranged so that when said two bodies are connected together as aforesaid the walls of the first sets of the two bodies define a plurality of inlet orifices through which a fuel/air mixture can enter a combustion chamber formed by the two grooves of the two bodies whereas the walls of the second sets of the two bodies define a plurality of outlet passages through which products of combustion can leave said combustion chamber.

9 Claims, 4 Drawing Figures

3,841,300

HEATING APPARATUS

This invention relates to a heating apparatus and has as its object the provision of such apparatus in a convenient form.

In accordance with the present invention there is provided heating apparatus for imparting heat to a fluid comprising a heating unit formed from at least two bodies of heat conducting material, each body having an elongated groove wherein opposite longitudinal edges of the groove are defined by a first and a second set respectively of spaced parallel walls upstanding from a base and defining respectively two rows of spaced parallel channels which communicate respectively with said opposite longitudinal edges of said groove, the two bodies being connected together with the walls of the first and second sets of one of said bodies disposed respectively in the channels defined between the first and second sets of the other body, the thickness of the walls relative to the spacing between adjacent walls of each set being such that when the two bodies are connected together to form said heating unit the walls of the first sets of the two bodies define a plurality of inlet orifices through which a fuel/air mixture can enter a combustion chamber formed by the two grooves of the two bodies and the walls of the second sets of the two bodies define a plurality of outlet passages through which products of combustion can leave said combustion chamber.

Preferably, the width of said first set of walls of said one body is less than the width of said first set of walls of said other body thereby to increase the effective area of those ends of said inlet orifices adjacent said combustion chamber.

Said two bodies may be connected together as by means of welded or they may be provided with means for releasably connecting them together and conveniently such means takes the form of an abutment on one of the walls of both the first and second sets of walls of each body, each abutment being locatable within a recess formed in an in use adjacent wall of the other body.

Conveniently, each unit is provided with means for releasably connecting it to one or more similar units in an end to end relationship with the combustion chambers of the units in direct communication.

If desired, two or more units can be arranged in side by side relationship in which case a common fuel/air mixture inlet or a common exhaust outlet could be provided for the two units.

Preferably, each body is extruded from a block of material having a high thermal conductivity.

Desirably, each body is provided with heat emitting surface means in the form of fins arranged to transfer heat to the fluid which is caused to flow over said heat emitting surface means.

The invention will now be more particularly described with reference to the accompanying drawings wherein.

Figure 1:
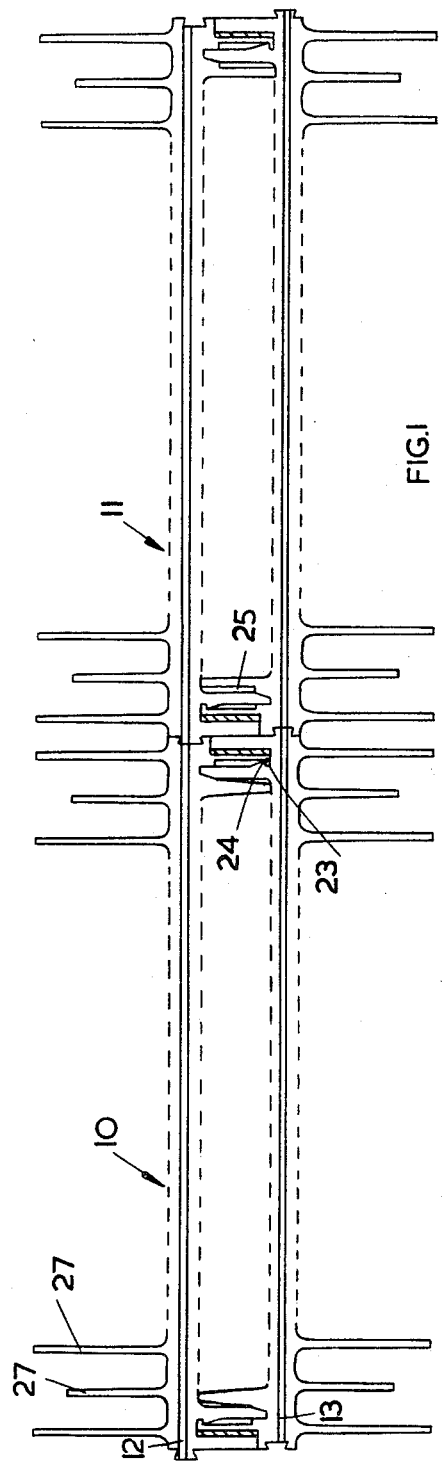
FIG. 1 is a side view of one embodiment of heating apparatus constructed in accordance with the invention.

Referring to the drawings, there is shown therein heating apparatus for imparting heat to a fluid comprising a pair of heating units 10 and 11 connected together in an end to end relationship, each unit being formed from at least two bodies 12 and 13 which are each extruded from a block of heat conducting material, and preferably from a block of material having a high thermal conductivity, such as aluminium.

Each body 12, 13 has an elongated groove 15 wherein opposite longitudinal edges of the grooves 15 are defined by a first set 16 and a second set 17 respectively of spaced parallel walls 18 of tapered cross-section upstanding from a base 19. The walls 18 of the first set 16 and the second set 17 define respectively two rows 20 and 21 of spaced parallel channels 22 which communicate respectively with said opposite longitudinal edges of the groove 15.

The two bodies 12 and 13 of each unit 10, 11 are connected together with the walls 18 of the first and second sets 16 and 17 respectively of one of the bodies disposed respectively in the channels 22 defined between the first and second sets of the other body. To connect the two bodies 12 and 13 together an abutment 23 is provided at the free end of one of the walls of both the first and second sets of each body, each abutment 23 being locatable within a recess 24 formed in an in use adjacent wall of the other body at a position adjacent the base 19 of said other body. Alternatively, the two bodies may be welded together.

The thickness of the walls 18 relative to the spacing between adjacent walls 18 of each set 16, 17 is such that when the two bodies 12 and 13 are connected together to form the unit 10 or 11, the walls 18 of the first sets 16 of the two bodies define a plurality of inlet orifices 25 (see FIG. 1) through which a fuel/air mixture can enter a combustion chamber 26 (see FIG. 2) formed by the two grooves 15 of the two bodies 12 and 13 and the walls of the second sets 17 of the two bodies define a plurality of outlet passages through which products of combustion can leave the combustion chamber 26. The portion of the unit 10 or 11 bounding these outlet passages forms at least a part of a heat exchanger. Each inlet orifice 25 is aligned with an outlet passage and the dimensions of each inlet orifice measured in a direction at right angles to the direction of fuel/air mixture entering these orifices will be equal to the dimensions of each outlet passage measured in a direction at right angles to the direction of flow of the products of combustion. Thus, with reference to FIG. 1, it is to be understood that the outlet passages are in fact respectively aligned with the inlet orifices 25, and in FIG. 1 such outlet passages lie directly beneath the inlet orifices 25.

The exterior of each unit 10, 11 is provided with heat emitting surface means in the form of a plurality of fins 27 which are arranged to transfer heat to a fluid (such as air) which is caused to flow over the fins 27. The fins 27 project from each base 19 on the side thereof opposite to said walls 18, with which they are integrally formed alternate fins projecting an equal distance from their associated base whilst adjacent fins project equally from their associated base by a different distance.

Alternatively, those fins in the central portion of the length of each body may be of equal length, the fins at either end of the body being of varying length or other combinations of long and short fins may be used.

Figure 2:
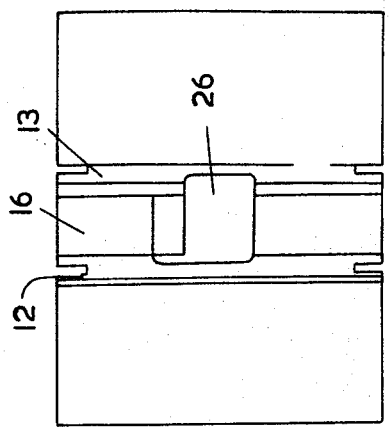
FIG. 2 is an end view of the heating apparatus shown in FIG. 1.
Figure 3:
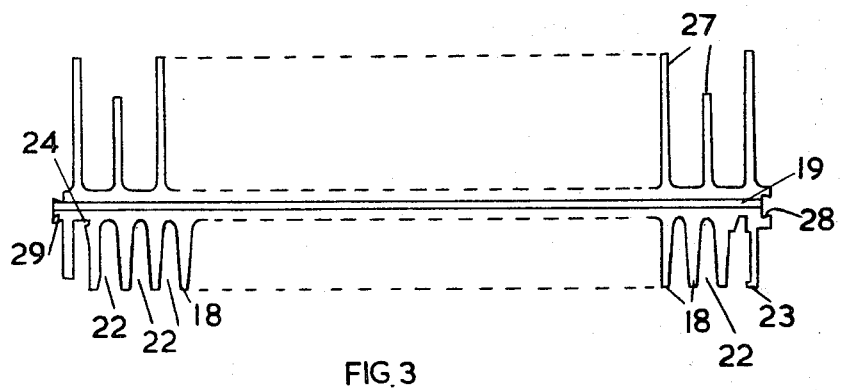
FIG. 3 is a side view of a part of the apparatus shown in FIGS. 1 and 2.
Figure 4:
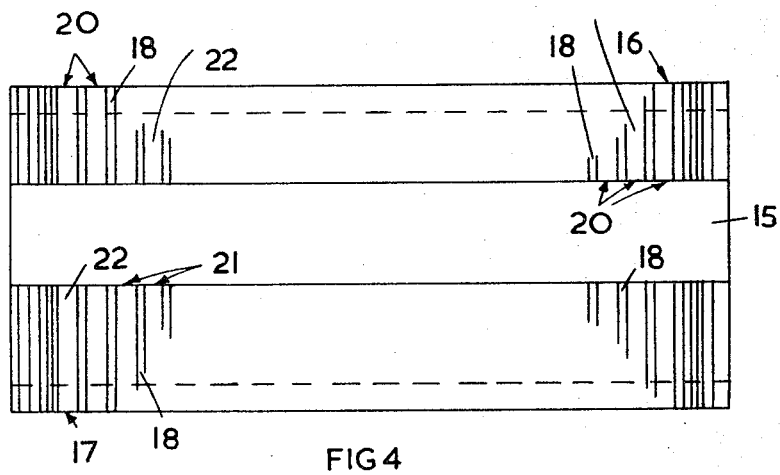
FIG. 4 is an underneath plan view of the part shown in FIG. 3.

The width of the walls of the first set of walls 16 of the body 12 is less than the width of the walls of the first set of walls 16 of the body 13 (as shown in FIG. 2) thereby to increase the effective area of these ends of the inlet orifices 25 adjacent the combustion chamber 26. Moreover, the dimensions of the aforesaid outlet passages are such that the speed of flow of products of combustion through the outlet passages will inhibit or minimise the formation of stagnant boundary layers within the outlet passages by utilizing the expansion of said fuel/air mixture, consequent upon combustion thereof. Such stagnant boundary layers are normally formed when hot gases pass over a surface to which heat is to be imparted. These layers consist of gases which flow over said surface at a much reduced velocity (such reduction in velocity being caused by frictional effects) relative to the velocity of flow of the remainder of the gases flowing past the surface and this reduced velocity causes said layer to impart its heat to the surface fairly rapidly. Consequently, said layer will become relatively cool in comparison to the remainder of the hot gases. This cool air serves as a heat insulator between said surface and the remainder of the hot gases thus substantially reducing the efficiency of heat transfer to the surface. The present arrangement inhibits or minimises this stagnant boundary layer by utilizing the natural expansion of gas in a combined combustion chamber and by providing outlet passages of such dimensions that the velocity and turbulence of hot gases through these passages creates a scrubbing action which will disturb or prevent formation of such layers.

Each base 19 has at opposed ends a recess 28 of dove-tailed configuration and an abutment 29 also of dove-tailed configuration. Each unit 10 thus has at each end a recess 28 and an abutment 29 which are slidably engageable respectively with an abutment 29 and the recess 28 formed on a further unit. Thus, several units (as shown only two) can be connected together in end to end relationship with adjacent combustion chambers 26 in direct communication. The heating apparatus formed from one, two or even more units 10, 11 has one end of its combustion chamber closed whilst a wall at the other end of the combustion chamber is apertured sealingly to receive a suitable high tension igniter (not shown).

Furthermore, two assemblies each comprising one, two or even more units 10, 11 may be arranged side by side in which case a common fuel/air mixture inlet or a common exhaust outlet could be provided for the two assemblies. Moreover by removing one or more of the walls of each of the first sets 16 of walls and by interconnecting the passages thus formed so that they do not communicate directly with a common fuel/air mixture inlet then only one high tension igniter need be provided since flames established in the combustion chamber having an associated high tension igniter will pass through the last mentioned passages and ignite fuel/air mixture issuing into the other combustion chamber. It is to be appreciated that more than two of said assemblies may be arranged in side by side relationship.

In use, a fuel/air mixture preferably in the form of a gas/air mixture is fed into an inlet manifold (not shown) from where it passes through the inlet orifices 25 to the combustion chamber 26. This gas/air mixture is then ignited within the combustion chamber 26 by means of a spark produced by the aforesaid high tension igniter. The resulting flame will be anchored at positions where the inlet orifices 25 communicate with the combustion chamber 26 if the conditions are arranged so that the speed of propagation of the flame within the gas/air mixture is less than the velocity of flow through the inlet orifices 25 and greater than the velocity of flow in the combustion chamber. These resulting flames will be wholly maintained within the heating apparatus. The majority of heat released by combustion will therefore be transferred to the material surrounding the outlet passages and this heat will be transferred through the material of each unit 10, 11 to the fins 27 whereupon it will be imparted to air passing over the fins. It is to be appreciated that each unit 10, 11 is a sealed unit ignoring the fact that its associated combustion chamber may be in direct communication with a combustion chamber of a similar unit and no secondary air is supplied to the combustion chamber. Thus the fuel/air mixture entering the combustion chamber 26 through the inlet orifices 25 includes at least the whole of the air for combustion.

The above embodiment may be used in a warm air domestic central heating system but it will be appreciated that it has many other uses. For instance, by not providing the fins 27 and by increasing the thickness of each base 19, apertures may be formed in the bases 19 for reception of conduits through which a liquid, such as water to be heated can flow. Alternatively the embodiment described above may be inserted into a tank containing a liquid in which case it may act as an immersion heater.

We claim:

1. Heating apparatus for imparting heat to a fluid comprising a heating unit formed from at least two bodies of heat conducting material, each body having an elongated groove wherein opposite longitudinal edges of the groove are defined by a first and a second set respectively of spaced parallel walls upstanding from a base and defining respectively two rows of spaced parallel channels which communicate respectively with said opposite longitudinal edges of said groove, the two bodies being connected together with the walls of the first and second sets of one of said bodies disposed respectively in the channels defined between the first and second sets of the other body, the thickness of the walls relative to the spacing between adjacent walls of each set being such that when the two bodies are connected together to form said heating unit the walls of the first sets of the two bodies define a plurality of inlet orifices through which a fuel/air mixture can enter a combustion chamber formed by the two grooves of the two bodies and the walls of the second sets of the two bodies define a plurality of outlet passages through which products of combustion can leave said combustion chamber.

2. Heating apparatus as claimed in claim 1 wherein the width of said first set of walls of said one body is less than the width of said first set of walls of said other body thereby to increase the effective area of those ends of said inlet orifices adjacent said combustion chamber.

3. Heating apparatus as claimed in claim 1 wherein said two bodies are provided with means for releasably connecting them together, said means comprising an abutment on one of the walls of both the first and second sets of walls of each body, each abutment being locatable within a recess formed in an in use adjacent wall of the other body.

4. Heating apparatus as claimed in claim 1 wherein said two bodies are welded together.

5. Heating apparatus as claimed in claim 1 wherein each unit is provided with means for releasably connecting it to one or more similar units in an end to end relationship with the combustion chambers of the units in direct communication.

6. Heating apparatus as claimed in claim 1 wherein each body is extruded from a block of material having a high thermal conductivity.

7. Heating apparatus as claimed in claim 1 wherein each body is provided on one side with a plurality of fins.

8. Heating apparatus as claimed in claim 7 wherein said fins are not all the same length.

9. Heating apparatus as claimed in claim 7 wherein said fins project from one side of the base, said walls projecting from the opposite side of the base, said fins and walls being formed integrally with the base.

* * * * *